(12) United States Patent
Gaikwad et al.

(10) Patent No.: US 11,236,006 B2
(45) Date of Patent: Feb. 1, 2022

(54) METHOD FOR FABRICATION OF OPTICAL FIBRE SOOT PREFORM

(71) Applicant: Sterlite Technologies Limited, Aurangabad (IN)

(72) Inventors: Sandeep Gaikwad, Aurangabad (IN); Badri Gomatam, Aurangabad (IN); Anand Pandey, Aurangabad (IN)

(73) Assignee: STERLITE TECHNOLOGIES LIMITED, Aurangabad (IN)

( * ) Notice: Subject to any disclaimer, the term of this patent is extended or adjusted under 35 U.S.C. 154(b) by 0 days.

(21) Appl. No.: 16/993,176

(22) Filed: Aug. 13, 2020

(65) Prior Publication Data
US 2021/0047226 A1    Feb. 18, 2021

(30) Foreign Application Priority Data

Aug. 13, 2019 (IN) .............................. 201921032808

(51) Int. Cl.
*C03B 37/018* (2006.01)
(52) U.S. Cl.
CPC .............................. *C03B 37/01853* (2013.01)
(58) Field of Classification Search
CPC ................................................ C03B 37/01853
See application file for complete search history.

(56) References Cited

U.S. PATENT DOCUMENTS

| 2003/0140657 A1* | 7/2003 | Oswald | C03B 19/102 65/391 |
| 2018/0002217 A1* | 1/2018 | Boughton | C03B 37/01217 |
| 2020/0038796 A1* | 2/2020 | Fekety | B01D 47/06 |

FOREIGN PATENT DOCUMENTS

| DE | 3338888 A1 * | 5/1984 | ........... C01B 33/183 |

* cited by examiner

Primary Examiner — Cynthia Szewczyk

(57) ABSTRACT

The present disclosure provides a method for fabrication of an optical fibre soot preform. The method includes production of silicon dioxide particles along with waste particulates. The silicon dioxide particles are produced using a precursor material in a combustion chamber. In addition, the method includes cooling of the silicon dioxide particles. Further, the method includes agglomeration of the silicon dioxide particles. Furthermore, the method includes separation of the waste particulates from the silicon dioxide particles. Moreover, the method includes dehydration of the silicon dioxide particles. Also, the method includes compaction of the silicon dioxide particles. The compaction of the silicon dioxide particles facilitates fabrication of the optical fibre soot preform.

7 Claims, 3 Drawing Sheets

METHOD FOR FABRICATION OF OPTICAL FIBRE SOOT PREFORM

BACKGROUND OF THE INVENTION

Field of the Invention

The present disclosure relates to the field of optical fibre. More particularly, the present disclosure relates to a method for fabrication of an optical fibre soot preform using compaction process. This application is based on, and claims priority from an Indian Application Number 201921032808 filed on 13 Aug. 2019.

Description of the Related Art

Over the last few years, optical fibers are widely used for network communication due to enormous benefits over metal wires. The increasing demand of the optical fibers leads to mass production of optical fibre preform. Conventionally, the optical fibre preform are manufactured using various methods. The various methods include but may not be limited to outside vapor deposition (OVD) and vapor axial deposition (VAD). The basic process involved in the OVD is called "flame hydrolysis". In this process, SiCl4 reacts with oxygen and hydrogen to produce silica (SiO2), hydrogen chloride (HCl), and water vapor (H2O). This reaction takes place within an oxy-hydrogen flame. Further, oxygen is passed through vaporized silicon chloride to form a mixture of SiCl4 vapor and oxygen. In addition, the OVD process is a limiting process with complex machine designs for fabrication of the optical fibre preform in bulk. Furthermore, fabrication of the optical fibre preform using the OVD process leads to reduced materials efficiency. Due to reduced materials efficiency the running cost is high and also consumes time.

In light of the above stated discussion, there is a need for an improved method for fabrication of an optical fibre soot preform.

BRIEF SUMMARY OF THE INVENTION

In an aspect, the present disclosure provides a method for fabrication of an optical fibre soot preform. The method includes production of silicon dioxide particles along with waste particulates. In addition, the method includes cooling of the silicon dioxide particles. Further, the method includes agglomeration of the silicon dioxide particles. Furthermore, the method includes separation of the waste particulates from the silicon dioxide particles. Also, the waste particulates include hydrogen chloride (herein after HCl), water (H2O), air, and nitrogen (N2). Also the method includes dehydration of the silicon dioxide particles. Moreover, the method includes compaction of the silicon dioxide particles. The silicon dioxide particles are produced using a precursor material in a combustion chamber. Also, the cooling of the silicon dioxide particles is done with facilitation of a jacket cooling chamber. Further, the agglomeration of the silicon dioxide particles is performed using a plurality of agglomerator tubes. Furthermore, the separation of the waste particulates from the silicon dioxide particles is carried out in a cyclone separator. Also, the silicon dioxide particles are dehydrated to remove water molecules from the silicon dioxide particles. Also, the compaction of the silicon dioxide particles facilitates fabrication of the optical fibre soot preform in a preform compaction chamber.

In an embodiment of the present disclosure, the combustion chamber includes an inlet and one or more burners. In addition, the combustion chamber is filled with one or more purging gases. Also, the one or more purging gases are inserted in the combustion chamber through the inlet.

In an embodiment of the present disclosure, the precursor material is at least one of silicon tetrachloride or octamethylcyclotetrasiloxane. In addition, the precursor material is hydrolysed with the one or more purging gases. Further, hydrolysis of the precursor material facilitates the production of the silicon dioxide particles.

In an embodiment of the present disclosure, the agglomeration of the silicon dioxide particles is done using the plurality of agglomerator tubes. [0010] In an embodiment of the present disclosure, the outer sheath of the bendable optical fibre cable is characterized by flexural modulus in range of about 50 megapascals to 500 megapascals.

In an embodiment of the present disclosure, the jacket cooling chamber surrounds the plurality of agglomerator tubes. In addition, the jacket cooling chamber is used for the cooling of the silicon dioxide particles.

In an embodiment of the present disclosure, the separation of the waste particulates from the silicon dioxide particles is done using the cyclone separator. Further, the cyclone separator includes a first inlet, an outlet and a second inlet.

In an embodiment of the present disclosure, the preform compaction chamber facilitates the compaction of the silicon dioxide particles. In addition, the compaction of the silicon dioxide particles is done with facilitation of uniaxial compaction process, isostatic compaction process, and hot isostatic compaction process. In an another embodiment of the present disclosure, the compaction of the silicon dioxide particles is done with any suitable combination of uniaxial compaction process, isostatic compaction process, and hot isostatic compaction process.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
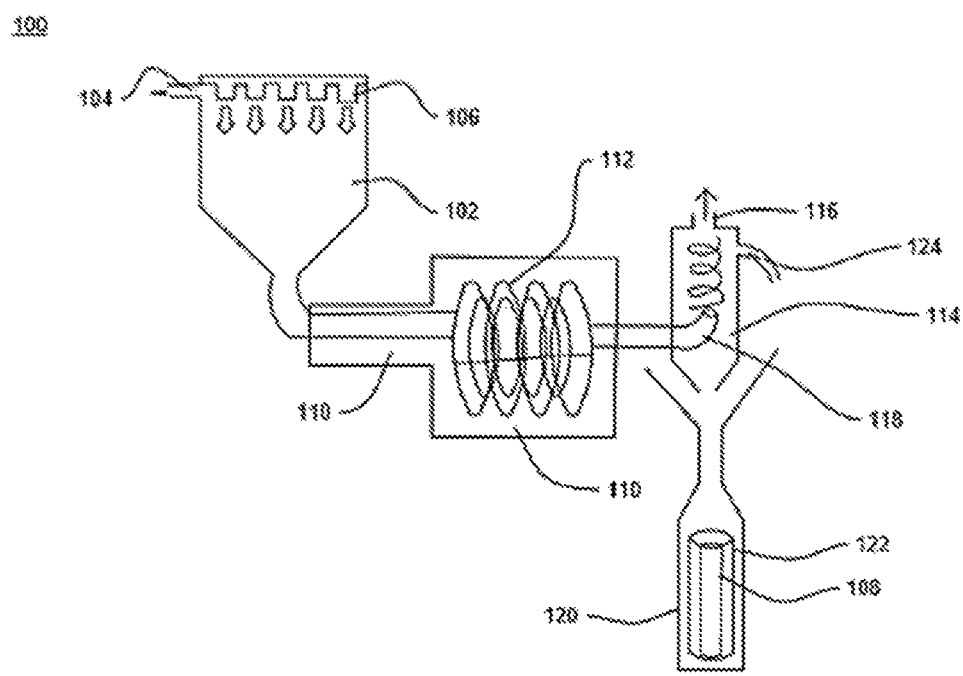
FIG. 1 illustrates a general overview of a system for fabrication of an optical fibre soot preform, in accordance with an embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a general overview of a system 100 for fabrication of an optical fibre soot preform 122, in accordance with an embodiment of the present disclosure. FIG. 1 shows an arrangement of various components of the system 100. The various components of the system 100 collectively enables continuous process for fabrication of the optical fibre soot preform 122.

The system 100 includes a combustion chamber 102, an inlet 104, one or more burners 106, silicon dioxide particles 108, a jacket cooling chamber 110, a plurality of agglomerator tubes 112, a cyclone separator 114, a first inlet 118, a second inlet 124, an outlet 116 and a preform compaction chamber 120.

The system 100 includes the combustion chamber 102. In general, combustion chamber is an enclosed space that enables combustion. In an embodiment of the present disclosure, the combustion chamber 102 includes the inlet 104, and the one or more burners 106.

In an embodiment of the present disclosure, the combustion chamber 102 is utilized to produce the silicon dioxide particles 108. The silicon dioxide particles 108 are produced using a precursor material. The precursor material is released into the combustion chamber 102 with facilitation of the one or more burners 106. In an embodiment of the present disclosure, the precursor material is heated using the one or more burners 106. In addition, heating of the precursor material produces the silicon dioxide particles 108 along with the waste particulates. The waste particulates include but may not be limited to hydrogen chloride (HCl), water ($H_2O$), air and nitrogen ($N_2$).

In an embodiment of the present disclosure, the precursor material is at least one of silicon tetrachloride or octamethylcyclotetrasiloxane (OMCTS or D4). In general, octamethylcyclotetrasiloxane is an organosilicon compound with chemical formula $[(CH3)2SiO]_4$. In addition, octamethylcyclotetrasiloxane is a colorless viscous liquid. In another embodiment of the present disclosure, the precursor material may vary. In an embodiment of the present disclosure, the combustion chamber 102 is filled with the one or more purging gases. In addition, the one or more purging gases are used to maintain temperature of the combustion chamber 102.

The combustion chamber 102 is associated with the jacket cooling chamber 110. The jacket cooling chamber 110 is a cooling chamber. In addition, the jacket cooling chamber 110 is used for cooling of the silicon dioxide particles 108 along with the waste particulates. Further, the jacket cooling chamber 110 surrounds the plurality of agglomerator tubes 112. In an embodiment of the present disclosure, the plurality of agglomerator tubes 112 is utilized to perform agglomeration of the silicon dioxide particles 108. In general, agglomeration is a collection of material in mass to increase the size of the particles. In an embodiment of the present disclosure, the agglomeration of the silicon dioxide particles 108 is performed for required size of the silicon dioxide particles 108 from agglomerator tubes based on the plurality of agglomerator tubes 112. The jacket cooling chamber 110 and the plurality of agglomerator tubes 112 are part of the system 100.

The system 100 includes the cyclone separator 114. In general, cyclone separator is used to separate suspension of solid in gas. In addition, cyclone separator works on principle of centrifugal force to separate small particles and large particles present in a suspension of solid in gas. In an embodiment of the present disclosure, the cyclone separator 114 separates the silicon dioxide particles 108 and the waste particulates.

In an embodiment of the present disclosure, the cyclone separator 114 includes the first inlet 118, the outlet 116 and a second inlet 124. In an embodiment of the present disclosure, the cyclone separator 114 receives the required size of the silicon dioxide particles 108 along with the waste particulates through the first inlet 118. Also, the cyclone separator 114 generates centrifugal force that separates the silicon dioxide particles 108 and the waste particulates. Further, the outlet 116 is utilized to release the waste particulates out of the cyclone separator 114. Furthermore, the second inlet 124 of the cyclone separator 114 is utilized to provide a dehydration gas into the cyclone separator 114. In an another embodiment of the present disclosure, the cyclone separator 114 may have first inlet 118 and the second inlet 124 at any other suitable position on the cyclone separator 114.

In an embodiment of the present disclosure, the silicon dioxide particles 108 along with the waste particulates undergoes dehydration in the cyclone separator 114. The silicon dioxide particles 108 along with the waste particulates are dehydrated to remove water molecules in the cyclone separator 114. The dehydration of the silicon dioxide particles 108 along with waste particulates are done using the dehydration gas. The dehydration gas includes Chlorine (Cl) but may not be limited to Chlorine. In addition, the dehydration gas is utilized to dehydrate the water molecules present in the cyclone separator 114. Further, the silicon dioxide particles 108 are collected in the preform compaction chamber 120 in a powdered form due to gravity.

The system 100 includes the preform compaction chamber 120. The preform compaction chamber 120 is used to perform compaction. In general, compaction is done to manufacture soot preform of required size and shape. In an embodiment of the present disclosure, the preform compaction chamber 120 is utilized to perform compaction of the silicon dioxide particles 108. In an embodiment of the present disclosure, the preform compaction chamber 120 is utilized to perform uniaxial compaction process. In general, uniaxial compaction process applies pressure to the material in a single axial direction. The silicon dioxide particles 108 are highly compacted during the uniaxial compaction process for formation of the optical fibre soot preform 122.

In another embodiment of the present disclosure, the preform compaction chamber 120 is utilized to perform isostatic compaction process. In general, isostatic compaction process applies pressure of liquid or gas or a suitable combination of both. to the material in all directions. The silicon dioxide particles 108 are compacted with the pressure of liquid or gas or a suitable combination of both in all directions during the isostatic compaction process for formation of the optical fibre soot preform 122. In yet another embodiment of the present disclosure, the preform compaction chamber 120 is utilized to perform combination of uniaxial compaction process and isostatic compaction process. The silicon dioxide particles 108 is compacted at lower density during the uniaxial compaction process that results into compacted silicon dioxide particles. Further, the compacted silicon dioxide particles undergo the isostatic compaction process for high compaction.

Figure 2:
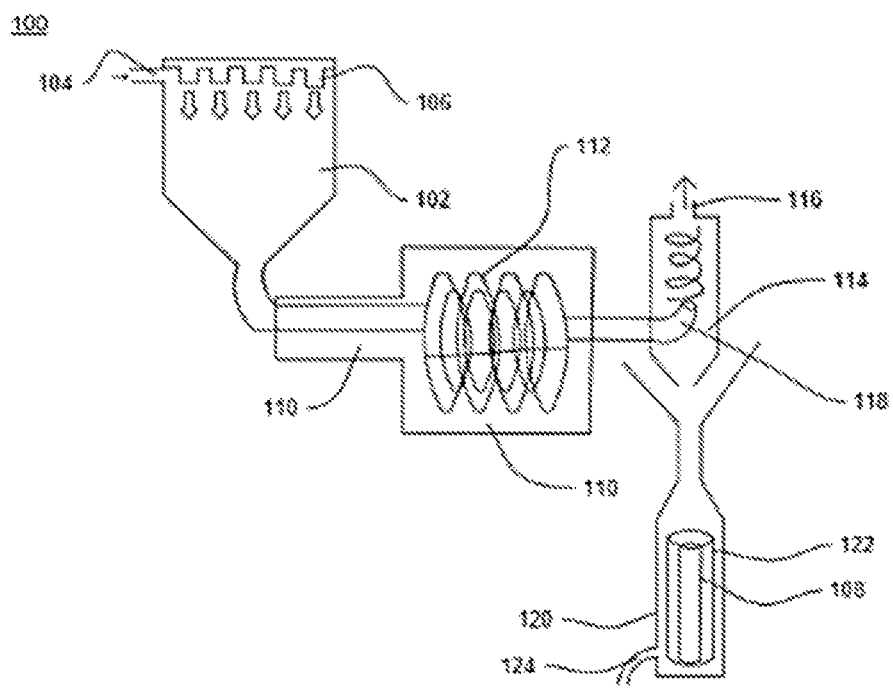
FIG. 2 illustrates a general overview of the system for fabrication of the optical fibre soot preform, in accordance with another embodiment of the present disclosure.

FIG. 2 illustrates a general overview of the system 100 for fabrication of the optical fibre soot preform 122, in accordance with another embodiment of the present disclosure. FIG. 2 shows an arrangement of components of the system 100. The components of the system 100 collectively enables continuous process for fabrication of the optical fibre soot preform 122. The components of FIG. 2 are similar to the various components of FIG. 1.

The system 100 includes the combustion chamber 102, the inlet 104, the one or more burners 106, the silicon dioxide particles 108, the jacket cooling chamber 110, the plurality of agglomerator tubes 112, the cyclone separator 114, the first inlet 118, the second inlet 124, the outlet 116 and the preform compaction chamber 120.

The system 100 includes the preform compaction chamber 120. The preform compaction chamber 120 includes the second inlet 124 (as shown in FIG. 2). Further, the second inlet 124 of the preform compaction chamber 120 is utilized to release the dehydration gas into the preform compaction chamber 120 during hot isostatic compaction process.

The preform compaction chamber 120 is utilized to perform compaction of the silicon dioxide particles 108. In an embodiment of the present disclosure, the preform compaction chamber 120 is utilized to perform hot isostatic compaction process. In general, hot isostatic compaction process increases the density of materials by applying pressure from all directions. The silicon dioxide particles 108 are compacted by applying pressure from all directions during the hot isostatic compaction process for the formation of the optical fibre soot preform 122. In an example, an argon gas is used as a pressurizing gas for the compaction of the silicon dioxide particles 108. In an another example of the embodiment of the present disclosure, the pressurizing gas for the compaction of the silicon dioxide particles 108 may have any other suitable gas. In another embodiment of the present disclosure, the preform compaction chamber 120 is utilized to perform combination of uniaxial compaction process and hot isostatic compaction process.

Figure 3:
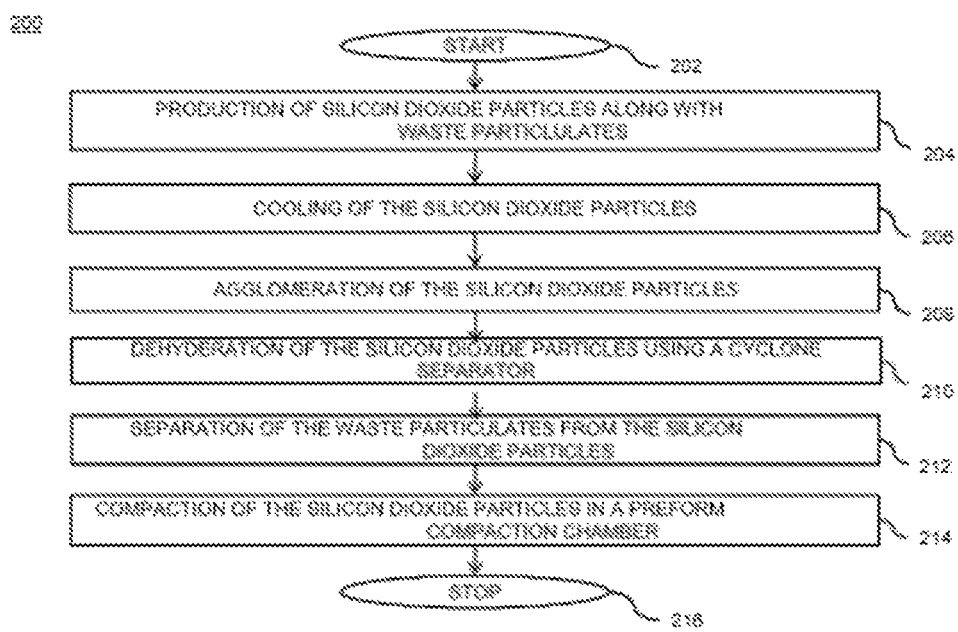
FIG. 3 illustrates a flowchart for a method for fabrication of the optical fibre soot preform, in accordance with various embodiments of the present disclosure.

FIG. 3 illustrates a flowchart 200 for a method for fabrication of the optical fibre soot preform 122, in accordance with various embodiments of the present disclosure. It may be noted that to explain the process steps of the flowchart 200, references will be made to the system components of FIG. 1. It may also be noted that the flowchart 200 may have lesser or more number of steps.

The optical fibre soot preform 122 is used to manufacture silicon dioxide clad cylinder. In addition, the optical fibre soot preform 122 is used to manufacture fluorine doped tubes.

The flowchart initiates at step 202. Following step 202, at step 204, the method includes the production of the silicon dioxide particles 108 along with the waste particulates. At step 206, the method includes the cooling of the silicon dioxide particles 108. At step 208, the method includes the agglomeration of the silicon dioxide particles 108 for required size of the silicon dioxide particles 108. At step 210, the method includes the dehydration of the silicon dioxide particles 108 in the cyclone separator 114. At step 212, the method includes the separation of the silicon dioxide particles 108 in the cyclone separator 114. At step 214, the method includes the compaction of the silicon dioxide particles 108 based on the uniaxial compaction process, isostatic compaction process and hot isostatic compaction process to fabricate the optical fibre soot preform 122. The flow chart 200 terminates at step 216.

The present disclosure provides numerous advantages over the prior art. The present disclosure provides an improved method for fabrication of the optical fibre soot preform. The method provides leapfrog improvement that provides high material efficiency and stoichiometric energy consumption. In addition, the method provides elimination of many steps and processes. Further, the method provides substantial reduction in overall footprint of plant.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. A method for fabrication of an optical fibre soot preform, the method comprising:

production of silicon dioxide particles along with waste particulates, wherein the waste particulates comprises HCl, H2O, air, and N2, wherein the silicon dioxide particles are produced using a precursor material in a combustion chamber;

cooling of the silicon dioxide particles, wherein the cooling of the silicon dioxide particles is done with facilitation of a jacket cooling chamber;

agglomeration of the silicon dioxide particles, wherein the agglomeration of the silicon dioxide particles is performed using a plurality of agglomerator tubes;

separation of the waste particulates from the silicon dioxide particles (108), wherein the separation of the waste particulates from the silicon dioxide particles is carried out in a cyclone separator;

dehydration of the silicon dioxide particles, wherein the silicon dioxide particles are dehydrated for removing water molecules from the silicon dioxide particles; and compaction of the silicon dioxide particles, wherein the compaction of the silicon dioxide particles facilitates fabrication of the optical fibre soot preform in a preform compaction chamber.

2. The method as claimed in claim 1, wherein the combustion chamber comprises an inlet and one or more burners, wherein the combustion chamber is filled with one or more purging gases, wherein the one or more purging gases are released in the combustion chamber through the inlet.

3. The method as claimed in claim 1, wherein the precursor material is at least one of silicon tetrachloride or octamethylcyclotetrasiloxane, wherein the precursor material is hydrolysed with the one or more purging gases, wherein hydrolysis of the precursor material facilitates the production of the silicon dioxide particles.

4. The method as claimed in claim 1, wherein the agglomeration of the silicon dioxide particles is done using the plurality of agglomerator tubes.

5. The method as claimed in claim 1, wherein the jacket cooling chamber surrounds the plurality of agglomerator tubes, wherein the jacket cooling chamber is used for the cooling of the silicon dioxide particles.

6. The method as claimed in claim 1, wherein the separation of the waste particulates from the silicon dioxide particles is done using the cyclone separator, wherein the cyclone separator comprises a first inlet, an outlet, and a second inlet.

7. The method as claimed in claim 1, wherein the preform compaction chamber facilitates the compaction of the silicon dioxide particles, wherein the compaction of the silicon dioxide particles is done with facilitation of uniaxial compaction process, isostatic compaction process and hot isostatic compaction process.

* * * * *